United States Patent [19]

Jonnes et al.

[11] Patent Number: 4,749,059

[45] Date of Patent: Jun. 7, 1988

[54] APPARATUS AND METHOD FOR LUBRICATING CABLES

[75] Inventors: Nelson Jonnes, Stillwater; Gene C. Weitz, Vadnais Heights, both of Minn.

[73] Assignee: American Polywater Corporation, Stillwater, Minn.

[21] Appl. No.: 820,439

[22] Filed: Jan. 17, 1986

[51] Int. Cl.⁴ .......................... F16N 7/24; B05C 3/02; B05D 1/18; G01F 11/28
[52] U.S. Cl. ...................................... 184/15.1; 184/16; 118/405; 118/DIG. 18; 427/434.7; 222/450
[58] Field of Search ................... 184/15.1, 15.2, 15.3, 184/16, 17; 118/307, 404, 405; 427/434.7; 222/450; 239/600; 428/100; 24/36, 442; 401/196

[56] References Cited

U.S. PATENT DOCUMENTS

| | | | |
|---|---|---|---|
| 604,321 | 5/1898 | Haye | 222/450 |
| 1,471,583 | 10/1923 | Andersen | 184/15.1 |
| 1,857,218 | 5/1932 | Sawyer | 222/450 |
| 2,347,392 | 4/1944 | Bouget | 118/405 |
| 2,740,556 | 4/1956 | Baron | 222/450 |
| 3,186,645 | 6/1965 | Eberlain | 239/600 |
| 3,212,671 | 10/1965 | Rock | 222/450 |
| 3,347,741 | 10/1967 | Hutchison | 222/450 |
| 3,430,299 | 3/1969 | Copen | 24/16 R |
| 3,795,262 | 3/1974 | Post | 222/450 |
| 4,108,279 | 8/1978 | Marcell | 184/15 |
| 4,137,623 | 2/1979 | Taylor | 29/433 |
| 4,169,427 | 10/1979 | Crump et al. | 118/307 |
| 4,173,363, | 11/1979 | Stearns | 285/177 |
| 4,275,096 | 6/1981 | Taylor | 427/230 |
| 4,324,315 | 4/1982 | Charlton | 184/15.1 |
| 4,326,605 | 4/1982 | Conti | 184/15 |
| 4,413,934 | 11/1983 | Kern | 285/177 |

Primary Examiner—Carlton R. Croyle
Assistant Examiner—Jane E. Obee
Attorney, Agent, or Firm—Merchant, Gould, Smith, Edell, Welter & Schmidt

[57] ABSTRACT

A cable lubricating device (1) including a split housing (2). Lubricant (25) is introduced into the housing through a vertically oriented orifice (6), the cable (37) advancing in a generally horizontal direction. A coupling adaptor (59) permits withdrawl of lubricant by a standard fitting (64) without danger of the collapse of hose (56) even at high lubricant discharge pressures. A series of sponges (18, 19) apply lubricant to the cable in a metered fashion. A method is also disclosed wherein lubricant may be "preloaded" into conduit (26) to enhance uniform lubricant distribution.

3 Claims, 5 Drawing Sheets

APPARATUS AND METHOD FOR LUBRICATING CABLES

BACKGROUND OF THE INVENTION

1. Field of the Invention

This invention relates generally to a cable lubricating apparatus. In particular, this invention relates to an apparatus for supplying a lubricant to a fiber optic cable and an improved method of introducing the lubricant into a conduit through which the fiber optic cable will be pulled.

2. Description of the Prior Art

Wire lubricating devices are well known in the prior art. The basic concept of introducing a lubricant onto the surface of a wire is disclosed, for example, in U.S. Pat. No. 296,440, issued to Oliver. Oliver discloses the use of a cylinder "a" with an opening at each end, thereby permitting the introduction and removal of the cable from the cylinder in one continuous strand. The lubricant used is oil, which is introduced onto the surface of the wire through the medium of sawdust. The sawdust is packed in the cylinder and surrounds the cable as it is pulled through the device. The Oliver device is designed primarily to assist in the manufacture of barbed wire, and does not address the problems associated with placing a cable inside a closed, inaccessible conduit.

One attempt at solving the problem of depositing a lubricant into an inaccessible location is disclosed in U.S. Pat. No. 1,253,837, issued to Keating. The Keating patent uses a revolving tube 20, to force the lubricant down a shaft in order to reach inaccessible bearings. The lubricant introduced into the tube is designed only to reach the bearing 6. The problem of coating a continuous cable or wire with lubricant is not addressed.

Another example of a rope lubricating device is disclosed in U.S. Pat. No. 1,584,704, issued to Swan. The Swan disclosure utilizes a fibrous material 15 which absorbs lubricant from chamber 12, the lubricant being applied to the rope 16 as the rope is pulled past the fibrous sponge 15. The Swan device is designed to solve the problem of preventing abrasive contact between a relatively rough rope or cable 16 and a relatively large metal casing within which the rope resides. Swan does not disclose a method of uniformly coating a cable which is in contact with a conduit at substantially every point around its circumference.

Taken together, these previously described devices embody the basic components present in every cable lubricating apparatus. The results obtained with such simple devices are unsatisfactory, and each component of these devices has been the subject of intensive efforts at improvement, with the goal of improving the overall cable lubricating system. Each of these components will now be briefly discussed.

First, most cable lubricating devices utilize some resilient medium, such as sawdust, cork or sponge, to transfer the lubricant to the cable.

The problem of applying uniform and adequate sponge pressure to the cable being lubricated has long perplexed cable lubricator designers. For example, U.S. Pat. No. 1,102,965, issued to Smith, discloses a funnel shaped cable lubricator. The housing 1 is open at both ends to allow the introduction and removal of a single cable. The housing is shaped as a funnel to facilitate adding lubricant to the housing, but this structure necessitates use of the lubricator only in a vertically upright position. The effects of gravity tend to concentrate the lubricant at the bottom of the funnel, thereby partially negating the effect of having the large surface area of the sponge in contact with the cable.

One method of overcoming the effects of gravity when using a liquid lubricant is to place the cable lubricating device in a horizontal position. U.S. Pat. No. 1,049,170, issued to Thomas, discloses a relatively long horizontal casing 3 through which a cable or rope may be pulled. The Thomas device introduces a relatively uncontrolled amount of lubricant to the cable as it enters the channel 6, and utilizes various wiper brushes and a storage tube 29 to remove the excess lubricant as the cable is pulled through the channel. The excess lubricant must be continuously removed through valve 32 and reintroduced into funnel 12 in order to prevent excessive lubricant consumption.

All of the devices thus far mentioned have relied solely on gravity to supply the pressure needed to deposit lubricant on the cable. Often, however, the vertical separation between the lubricant reservoir and the cable to be coated is too small to create the pressure head needed to supply an adequate amount of lubricant to the cable.

One solution to this problem is disclosed in U.S. Pat. No. 2,201,803, issued to Todd, which uses a wick 28 to bring the lubricant material into close proximity with the cable 32. By moving the cable past the wick, a combination of electrostatic and aerodynamic forces attract the lubricant away from the wick and cause it to be deposited onto the surface of the cable. This system is effective, however, only when the cable can be moved by the wick at a relatively high speed. Also, in some cases, electrical grounding of the apparatus may be required to achieve the desired effect.

A similar utilization of the "suctional" effect of a moving cable is disclosed in U.S. Pat. No. 2,435,120, issued to Baker (column 2, lines 22-25).

In some cases, the amount of lubricant applied to the cable can be increased somewhat by the application of mechanical pressure to the sponge like material which contacts the cable. One attempt to increase the amount of lubricant transferred from a sponge-like material to a cable is disclosed in U.S. Pat. No. 1,589,108, issued to Caretta. The Caretta device utilizes a spring 10 which presses packing material 8 against the walls of lubricant containing sleeve 6. The use of the spring 10 tends to improve the quality of the seal at each end of the sleeve, and also increases the pressure of the packing material 8 against the surface of cable 5. The Caretta device, however, is designed only to coat a relatively small portion of the cable which is repeatedly pulled back and forth through the sleeve as part of a mechanical transmission device. Thus, the same small length of cable is repeatedly exposed to the lubricant, which tends to lessen the effect of any shortcomings in the lubricant application system.

Another example, U.S. Pat. No. 2,531,095, issued to Williams, discloses the use of resilient clip 24 to press saturated sleeve 18 against the cable 10. U.S. Pat. No. 2,604,650, issued to Mottelson, utilizes the pressure of a human hand to control the amount of pressure exerted by a split sponge 14 against cable 16, although in this case the sponge is used to remove material from the cable rather than to deposit lubricant.

The most common method of increasing the pressure of the lubricant against the cable within a cable lubricating device is to utilize a mechanical pump. U.S. Pat. No. 3,733,216, issued to Goldman, et al., shows the use of pump 5 to forcibly introduce and remove lubricant into channels 8 and 9.

U.S. Pat. No. 3,783,972, issued to Molstad, utilizes hand pump 25 to force a lubricant into cylindrical enclosure 16, thereby coating cable 18.

U.S. Pat. No. Re. 29,493, issued to Crump, utilizes a pump to direct fluid under high pressure onto a cable. In this particular device, the fluid is used to scour the cable in a cleaning operation, rather than for lubrication.

Other methods of applying a lubricant to a cable include the use of magnetic attraction between the lubricant and the cable, as disclosed in U.S. Pat. No. 3,851,623, issued to Landry, Jr. (column 4, lines 19–22).

Another common problem with cable lubricating devices is the inability of the device to uniformly coat the entire surface area of the cable. If the cable is readily accessible, one solution is to periodically coat the cable with an additional layer of lubricant. Such a device, designed to be used with motorcycle control cables and other cables which are exposed to an unprotected environment, is disclosed in U.S. Pat. No. 4,039,048, issued to Safholm. The Safholm device, however, is useful only for cables which may be removed and placed into a special lubricating apparatus.

A similar device for use in the field is disclosed in U.S. Pat. No. 4,042,065, issued to Crum, but this device is useful only for the very specialized purpose of relubricating the pin and bushing which interconnects the individual track lengths on a track-type vehicle.

Rather than attempt to relubricate a device in the field, a preferable solution for use with cables which will reside in a protected environment is to uniformly deposit the lubricant onto the cable during the initial application. U.S. Pat. Nos. 4,063,617 and 4,046,225, both issued to Shenk, disclose a conventional cable lubricating device in which the cable application sponges consist of split annular discs. The slits in the disc are rotatably displaced, and the discs themselves are longitudinally displaced so that the cable must pass through each of the discs during the lubricating process. The use of three discs tends to spread the lubricant evenly about the surface of the cable.

U.S. Pat. No. 4,326,605, issued to Conti, uses a series of bristles 19 located downstream from the point of initial lubricant application to uniformly spread the lubricant onto the surface of the cable. U.S. Pat. No. 4,336,866, issued to Blanton, Jr. utilizes a rotatable, mechanical die to remove excess lubricant and uniformly redistribute the lubricant that remains on the cable surface.

Other cable lubricating devices are designed to solve the problem of lubricating an inaccessible or stationary cable. U.S. Pat. No. 3,889,781, issued to Schott, et al., discloses a clamping fixture which may be attached to a cable at which time lubricant may be applied under pressure to a small section of the cable. This device anticipates that the cable will be housed in a relatively accessible environment rather than in a conduit.

U.S. Pat. No. 3,951,235, issued to Acerbi, discloses a device which can automatically lubricate cables when the cable system is in motion throughout its normal operation, such as in an elevator shaft or on a cable operated crane. The Acerbi device utilizes plate 33 to apply constant pressure to grease 39 as the supply of lubricant within the reservoir diminishes.

U.S. Pat. No. 4,169,427, issued to Crump, et al., discloses a lubricating device which travels along a stationary cable. Rollers 85, 86, 87 and 88 are utilized to transport the device along the cable.

U.S. Pat. No. 4,069,894, issued to Black, discloses a manually operated tool which is capable of reaching and lubricating cables in relatively inaccessible locations. The Black device utilizes an extendable handle 20 and a swiveling head 18 which permits sponge 24 to engage cable 26 and be moved manually along the portion of the cable where lubrication is desired.

Most relevant to the present invention are those devices which have attempted to solve the problem of providing lubrication to a cable which must be pulled through a conduit. One such method and apparatus is disclosed in U.S. Pat. No. 3,858,687, issued to Masarky, et al. Masarky utilizes small packets 12 of lubricant which are adhesively attached to the surface of the cable at various intervals. As the cable is pulled through the conduit, the packets are torn open and a lubricant is released. Such a lubricating system is complicated by the requirement that the packets must be individually applied to the cable surface. There is no assurance that lubricant will be provided where most needed, or that not all of the lubricant will be exhausted prior to finishing the pulling of an electrical cable through a conduit.

Other solutions to the problem or placing a cable in conduit utilize a lubricant dispensing apparatus which travels in the conduit ahead of the cable. U.S. Pat. No. 4,108,279, issued to Marcell, utilizes a dispenser 21 which is pulled through the conduit by piston assembly 30, thereby leaving a coating of lubricant on the inside of the conduit prior to the passage of the cable.

U.S. Pat. No. 4,275,096, issued to Taylor, discloses a method and apparatus utilizing cartridges. The cartridge 10 is pulled through conduit 18, the lubricant 48 being absorbed by core 28 and the excess being collected in chamber 46, where it may be reabsorbed by core 28 as the supply of lubricant within the core is periodically exhausted. A similar cartridge based device is disclosed by Taylor in his U.S. Pat. No. 4,137,623.

Each of the prior art devices described thus far have attempted to apply uniform coating of lubricant on a cable. In some applications, particularly where the cable does not reside within a conduit, a uniform coating of lubricant on a cable may be the optimum solution to the problem posed by a cable which must periodically slide past pulleys, bearings or casings.

An optimized cable lubricating device will deposit a disproportionately large amount of lubricant onto the front of the cable during the early stages of the cable pull and will deposit a relatively small amount of lubricant at the back end of the cable. Ideally, this should be accomplished without the use of pumps, brushes, wipers, or other mechanical contrivances which require external power or add mechanical complexity to the lubricating system. The problem of finding a simple method of lubricating a cable is particularly acute when fiber optic cable must be placed within a conduit, because fiber optic cable is relatively difficult to splice in the field. Therefore, many fiber optic cable installations involve pulling the cable a distance of thousands of feet without interruption, often without intermediate access to the cable, and at remote locations where power sources necessary for the operation of mechanical brushes or pumps is simply not available. Thus, while the devices of the prior art may have been satisfactory for their intended purposes, when they are applied to fiber optic cable installations, they are inadequate because of their complex design, cost, and labor intensive manner of use.

SUMMARY OF THE INVENTION

The present invention addresses the problems of the prior art, including those mentioned above, in that it comprises a mechanically straight-forward fiber optic cable lubricator which may be utilized to lubricate the cable as it is placed within a conduit.

The present invention utilizes the force of gravity and fundamental principles of fluid dynamics to deposit lubricant within the conduit and onto the cable according to an optimum distribution, that is, with the maximum amount of lubricant deposited onto the head of the cable and a minimal amount of lubricant near the end of the cable. The present apparatus utilizes a series of sponge-like materials to directly coat the surface of the cable with lubricant. An additional sponge-like material is attached in-line and in front of the cable and acts as a piston moving through the conduit, creating a partial vacuum within the conduit between the piston head and the housing of the cable lubricating device, the vacuum thereby drawing increased amounts of lubricant through the lubricating apparatus and onto the initial portions cable.

DESCRIPTION OF THE PREFERRED EMBODIMENT

Figure 1:
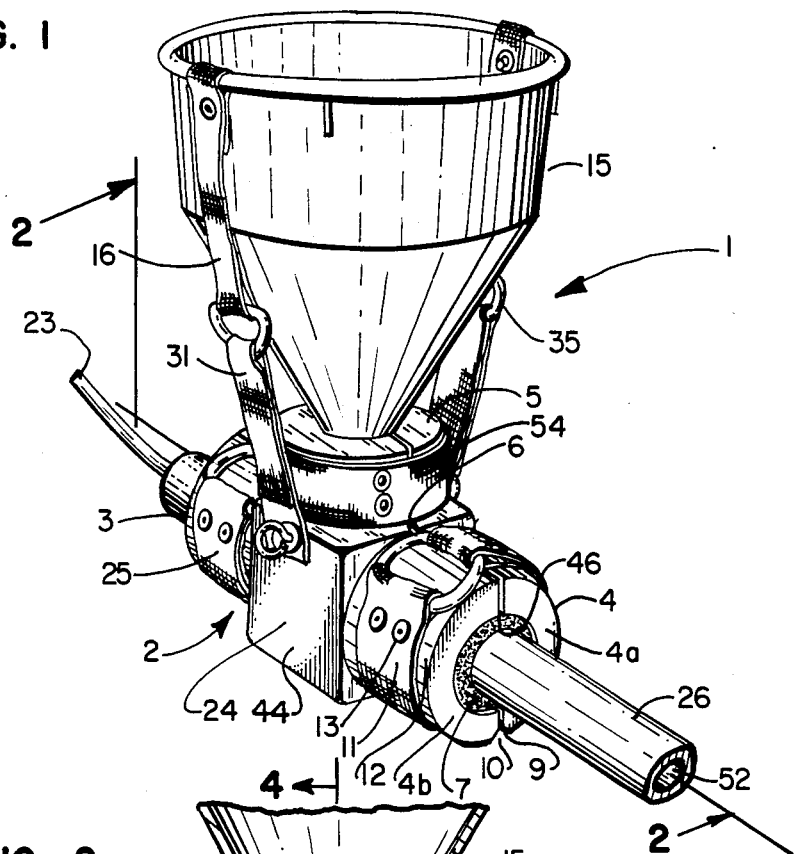
FIG. 1 is a perspective view of the cable lubricating device according to the present invention.

The preferred embodiment of the subject invention will now be discussed in some detail in conjunction with all of the figures of the Drawing, wherein like parts are designated by like reference numerals, insofar as it is possible and practical to do so.

Figure 5:
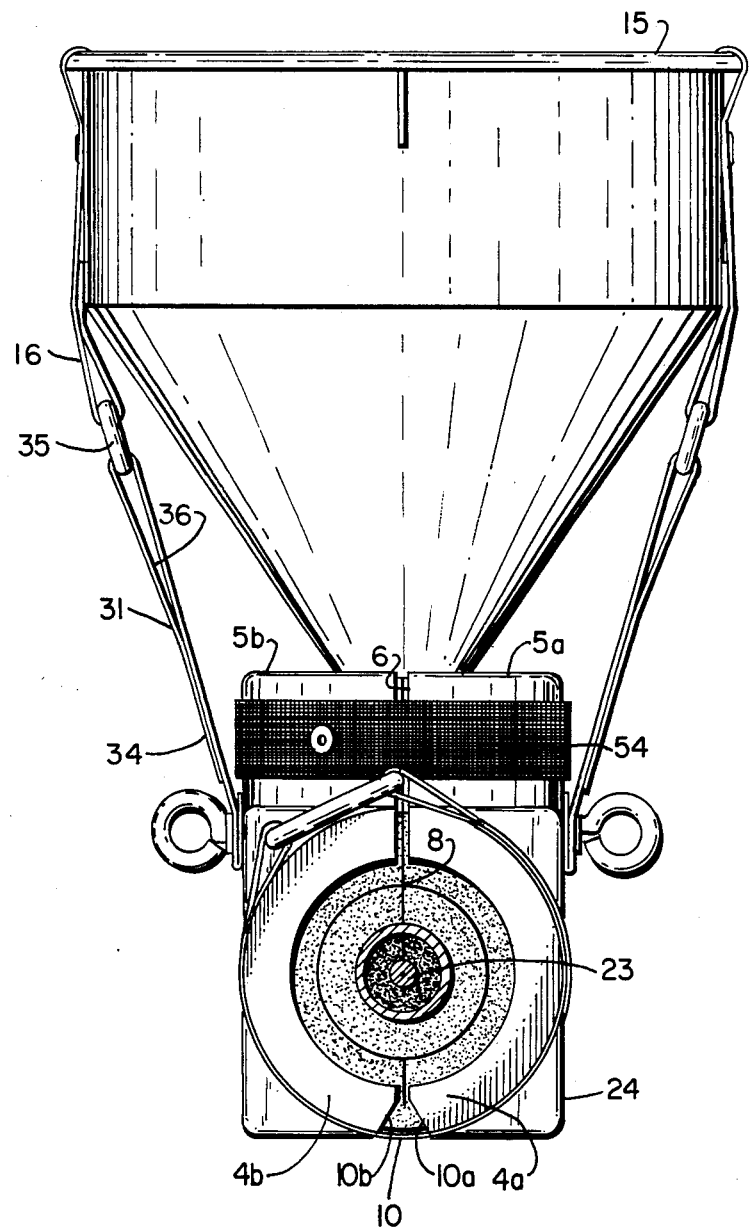
FIG. 5 is a front elevation of the present invention as depicted in FIG. 1.

Referring now to FIG. 1, there is shown a cable lubricant applicator apparatus 1 comprising an elongated container or housing 2. The central portion of the housing 2 is shaped generally as a rectangular solid or cube 24. The housing 2 also includes an entrance cylinder 3 and an exit cylinder 4. Cylinders 3 and 4 are formed integrally as a part of housing 2 and together with cube 24 they form a single molded unit. Also formed integrally with housing 2 is mating ring 5 which resides on housing 2 adjacent to cube 24 between cylinders 3 and 4. As shown in FIG. 5, the entire assembly formed by housing 2, cube 24, cylinders 3 and 4 and mating ring 5 is split radially along its longitudinal axis, forming a continuous gap 6. The gap 6 permits the unit formed by housing 2, cube 24, cylinders 3 and 4 and mating ring 5 to be opened in a hinged fashion.

In the preferred embodiment, cube 24, cylinders 3 and 4 and mating ring 5 actually consist of two mating halves which fit together to form the completed housing 2. For example, exit cylinder 4 includes a hemicylindrical portion 4a which mates with an opposite hemicylindrical portion 4b to form the completed exit cylinder 4. The two halves, 4a and 4b, are both adhesively fastened to a resilient elastic material 7 which is formed as a cylinder having an outside diameter that is substantially equal to the inside diameter of exit cylinder 4. The elastic material 7 contains a radial slot 8 which is aligned with gap 6 in order that exit cylinder 4 may be opened in a hinged manner. Diametrically opposite to gap 6 is a corresponding space 9 which is created where cylinder halves 4a and 4b meet. The space 9 is bevelled to form opposed slanted surfaces 10a and 10b near the edge of cylinder halves 4a and 4b respectively. The opposed slanted surfaces 10a and 10b permit cylinder 4 to be opened fully without a collision occurring between the two cylinder halves 4a and 4b. Entrance cylinder 3 and cube 24 are constructed in a similar manner. The housing 2 is preferably enclosed in a molded plastic case 44 which is formed as two mating halves and which is adhesively fastened to the housing 2. The molded plastic case 44 has a longitudinal gap 6 aligned with the radial slot 8 and an opposite hinge portion 10 about whose axis the housing 2 and plastic case 44 are opened.

Similarly, mating ring 5 includes a hemicylindrical portion 5a which mates with an opposite hemicylindrical portion 5b to form the completed mating ring 5. The two cylinder halves, 5a and 5b, are both adhesively fastened to a resilient elastic material 27 which is formed as a cylinder having an outside diameter that is substantially equal to the inside diameter of mating ring 5. The elastic material 27 contains a radial slot 28 which is aligned with gap 6 in order that mating ring 5 may be separated when housing 2 is opened in a hinged manner.

While the elastic material 7 contains a radial slot 8, there is no diametrically opposite slot corresponding to space 9. Thus, elastic material 7 continues across space 9 in an uninterrupted fashion. Due to the elastic nature of material 7, the elastic material 7 which resides within space 9 serves as a flexible hinge, thereby permitting housing 2 to be opened and closed repeatedly as if a conventional mechanical hinge were present to link the two mating halves of housing 2 together. This novel method of construction permits the two halves of housing 2 to be simply manufactured in accordance with wider tolerance, since the two mating halves need not fit together accurately, but instead must generally conform only to the flexible surface contour of elastic material 7.

In order to secure the individual halves of exit cylinder 4 together so as to form a relatively uninterrupted cylindrical body, strap 11 is placed circumferentially around the surface 12 of exit cylinder 4. Strap 11 is permanently attached to exit cylinder 4 by means of rivets 13. One end of strap 11 is threaded through a loop 14, the end of the strap 11 being placed adjacent to the remainder of the strap 11 and being secured to the surface 12 by means of rivets 13. In this manner, the loop 14 is permanently affixed to the strap 11 and the exit cylinder 4. The loop 14 is used to aid adjustment of the face end strap 11 once strap 11 is in place around cylinder 4. The free end 29 of strap 11 is placed through loop 14 and pulled taut so as to urge the mating halves 4a and 4b together. Free end 29 has an inner surface 30 that is lined with hooking fasteners such as Velcro ® which readily adheres to the remainder of strap 11 when free end 29 is pressed against strap 11 subsequent to the tightening process. A similar strap 25 secures the individual halves of entrance cylinder 3, the strap 25 being wrapped circumferentially around the surface of entrance cylinder 3. Finally, strap 54 secures the individual halves of mating ring 5 by surrounding the circumference of mating ring 5 in a manner similar to the circumferential wrapping of straps 11 and 25.

Figure 4:
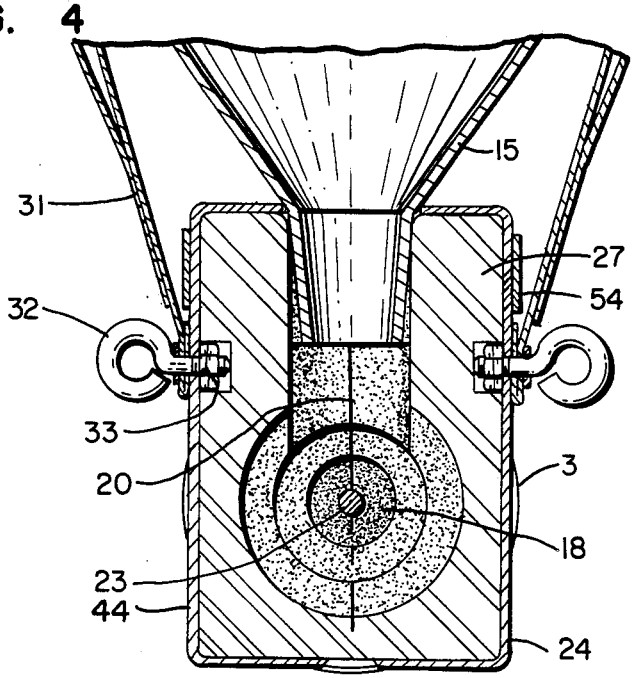
FIG. 4 is a sectional view of the present invention as viewed in a front elevation, taken along lines 4—4, as depicted in FIG. 2.

Inserted within mating ring 5 is funnel 15 which is secured to housing 2 by means of straps 16 and 31. As shown in FIG. 4, one end of strap 31 is attached to cube 24 by means of threaded eyebolt 32 and nut 33. As seen in FIG. 5, the free end 34 of strap 31 is threaded through loop 35 and pulled tautly, thereby urging funnel 15 into mating ring 5. The inner surface 36 of the free end 34 is lined with hooking fasteners, such as Velcro ®, which readily adheres to the remainder of strap 31.

Figure 2:
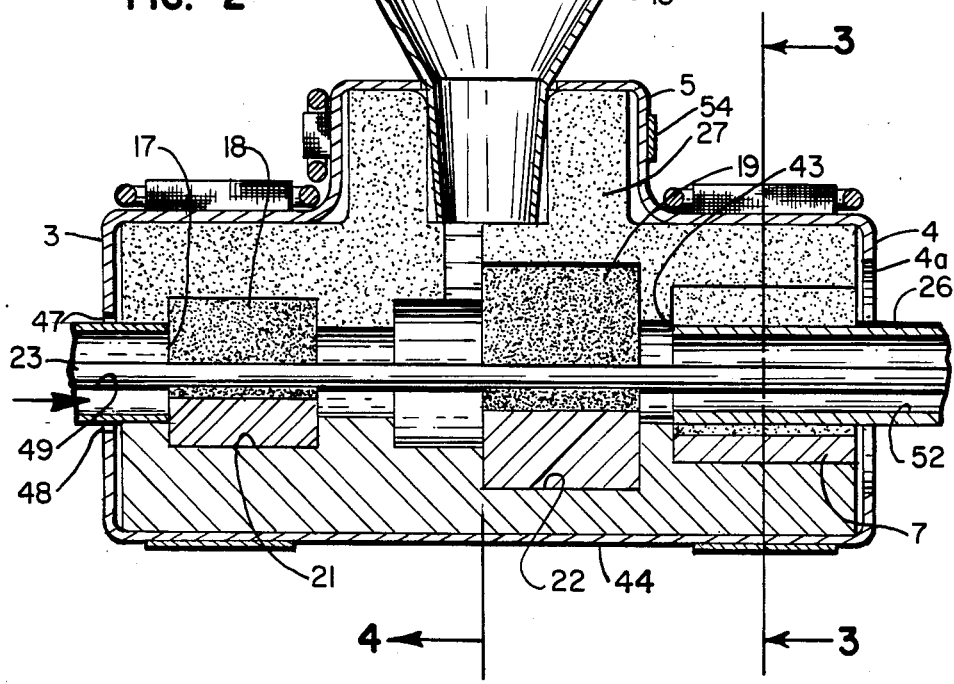
FIG. 2 is a sectional view of the device depicted in FIG. 1, taken along lines 2—2.
Figure 3:
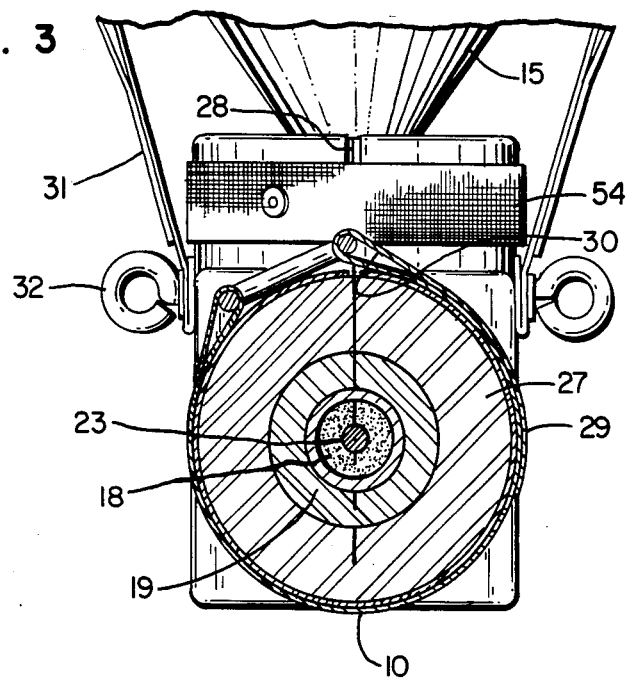
FIG. 3 is a sectional view of the apparatus of the present invention as seen in a front elevation, taken along lines 3—3, as depicted in FIG. 2.
Figure 6:
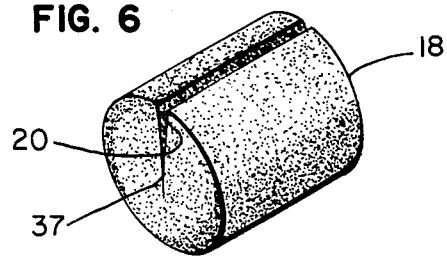
FIG. 6 is a perspective view of a sponge element as utilized in the apparatus of the present invention.

As can be seen in FIG. 2, housing 2 is lined with elastic material 7. Elastic material 7 is formed generally in the shape of a hollow cylinder, the longitudinal axis of this cylinder forming a channel 17. Residing within the channel is cleaning sponge 18 and wiping sponge 19. Sponges 18 and 19 are identical except for their placement within the housing 2. As shown in FIG. 6, sponge 18 generally comprises a cylinder of sponge like material in which a radial cut 20 has been made. The cut 20 typically extends to the center 37 of sponge 18. The cut is made merely by slicing the sponge without the removal of any of the sponge material. Multiple cuts may be made in the sponge as necessary in order to accommodate the presence of more than one cable 23. Within housing 2, elastic material 7 is cut away to form circumferential channel 21 within which cleaning sponge 18 is placed. Similarly, a larger circumferential cavity 22 is cut within elastic material 7 in an area longitudinally displaced from channel 21, in order to house wiping sponge 19. Due to the smaller size of channel 21 as compared to cavity 22, the sponge 18 is compressed to a greater extent than is sponge 19. This is consistent with the role of sponge 18 in pressing tightly against the surface of cable 23 so as to remove any dirt or debris that may be present as the cable 23 enters housing 2. The wiping sponge on the other hand, is designed to control the quantity of lubricant placed on the cable, and thus, a different amount of sponge pressure is required. The pressure applied by sponge 19 is dependent on the size of cavity 22. Thus, the size of cavity 22 may be varied in certain applications in order to conform to the needs of a particular cable size and lubricant.

In operation, the cable lubricant device 1 is used in the following manner. The straps which hold the housing 2 in place, such as strap 11, are loosened, thereby permitting the housing 2 to be opened by separating the halves of housing 2 along gap 6. The halves separate along hinge line 10. The cleaning sponge 18 is then press fitted into channel 21, and wiper sponge 19 is press fitted into circumferential cavity 22. Due to the larger dimensions of circumferential cavity 22, wiper sponge 19 is compressed to a smaller extent than is cleaning sponge 18. The cable 23 which is to be lubricated may then be placed within the housing such that the cable 23 is pressed as far as possible into radial cut 20 of the sponge 18 and 19. The leading end 24 of the cable 23 should be permitted to protrude past the end of exit cylinder 4 by a distance of a few inches.

The housing 2 should then be closed and resecured by means of strap 11. The funnel 15 is then placed within mating ring 5 and secured by strap 16. An alternate embodiment of the present invention includes a flexible neck funnel (not shown) which can be laced directly within mating ring 5. A stabilizing tube 45 may first be place within mating ring 5, and the funnel can then be easily inserted into and removed from tube 45 as required.

The conduit 26 is then press fitted into opening 17 of elastic material 7 which is present within exit cylinder 4. A suitable lubricant 25 is poured in funnel 15 and allowed to completely fill the cavity 17 within housing 2 and to thoroughly permeate cleaning sponge 18 and wiper sponge 19.

In the preferred embodiment of the present invention, prior to the beginning of the actual cable pulling operation, a tow line 37 is inserted into the conduit 26 for the entire length of the conduit through which the cable 23 will be pulled. When the cable pulling operation begins, the far end of the tow line 37 will be pulled, either by hand or some mechanical aid, thereby advancing the cable 23 through the conduit 26.

Initially, the near end 38 of the tow line 37 extends past the end 43 of the conduit 26. The first end 40 of a spreader sponge 39 is attached to the near end 38, the spreader sponge 39 being composed of a resilient material. When in an uncompressed state, the outside diameter of the spreader sponge 39 exceeds the inside diameter of conduit 26. Thus, when spreader sponge 39 is placed within conduit 26, sponge 39 is diametrically compressed and exerts some pressure against the inner wall 52 of conduit 26.

Prior to insertion of spreader sponge 39 into conduit 26, the second end 41 of spreader sponge 39 is attached to the end 24 of cable 23 by means of link 42. Before starting the pull, the operator should "pre-load" a suitable lubricant into the conduit, either by means of a funnel or pump. A suitable lubricant would be one such as described in U.S. Pat. No 4,461,712, or related lubricant product. The quantity of lubricant required to lubricate the conduit may be calculated from the equation:

$$Q = 0.001 \times L \times D$$

Where:
Q=quantity required in gallons.
L=length of the conduit in feet.
D=diameter of conduit in inches.

The quantity of lubricant calculated in this equation is only the amount required for conduit lubrication. A similar quantity of lubricant should be used to lubricate the cable with the lubricating apparatus 1 as the cable 23 enters the conduit 26.

If the conduit 26 becomes filled with lubricant before the entire quantity has been preloaded, a blast of compressed air may be used to blow the lubricant further within conduit 26 so that preloading may continue. When preloading is complete, the spreader sponge 39 is then inserted into conduit 26 a few inches past the conduit leading end 43 and the pull begins in a normal manner.

The elastic material 7 within exit cylinder 4 contains a cylindrical opening 46 formed by the extension of channel 17 throughout the length of housing 2. The diameter of channel 17 is chosen, during the manufacture of the housing 2, to be somewhat smaller than the outside diameter of the conduit 26 which will be encountered in the field. Due to the resilient, elastic nature of the material 7, the conduit 26 may be forcibly inserted into the mouth 46 of exit cylinder 4 and securely held therein by the compressive force exerted by material 7.

Since the diameter of channel 17 will typically exceed the outside diameter of cable 23, the entrance 47 of entrance cylinder 3 may be fitted with conduit adapter 48, which is selected to have an orifice 49 of a diameter that will snugly surround the conduit 26.

Once the cable 28 is placed within housing 2, and spreader sponge 39 is attached thereto and the conduit 26 is inserted into exit cyinder 4 as hereinbefore described, the cable pulling process may proceed. Any suitable lubricant 25 may be used and may be supplied from a pump, a conventional container 57 as show in FIG. 7, by means of a flexible, collapsible bag, or any other suitable method.

Figure 7:
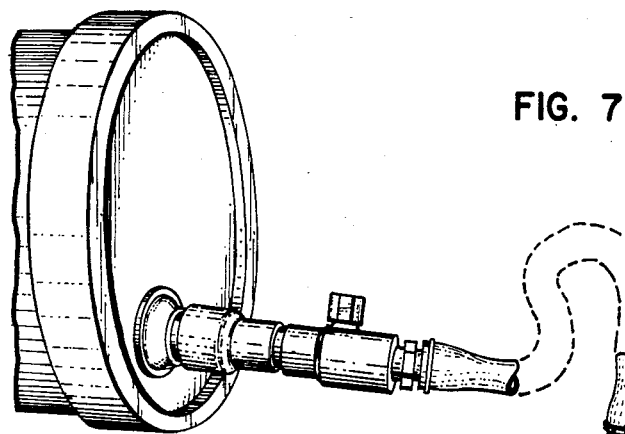
FIG. 7 is a perspective view of another embodiment of the present invention as depicted in FIG. 1, showing an alternate means of introducing lubricant into the apparatus.

A preferred method of supplying lubricant 25 to housing 2 includes a pail or other sealed container 57 which permits the lubricant to flow through a sealed system from the pail, traveling through hose 56 and thereby entering housing 2, as best shown in FIG. 7. The feed system, shown generally at 58, includes a pail attachment end fitting 59, a first metering valve 60, a length of hose or transparent tubing 56, a second on/off valve 61, a second pail attachment end fitting 62 and an insert end fitting 63.

Figure 10:
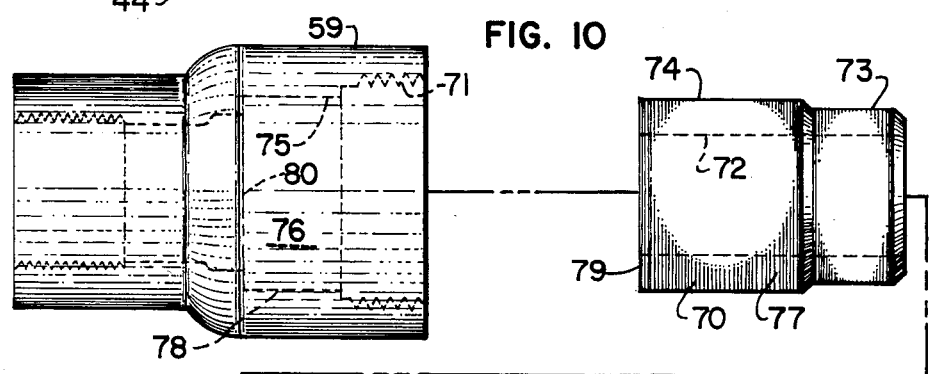
FIG. 10 is an expanded elevation of the adapter element portion of the present invention.
Figure 12:
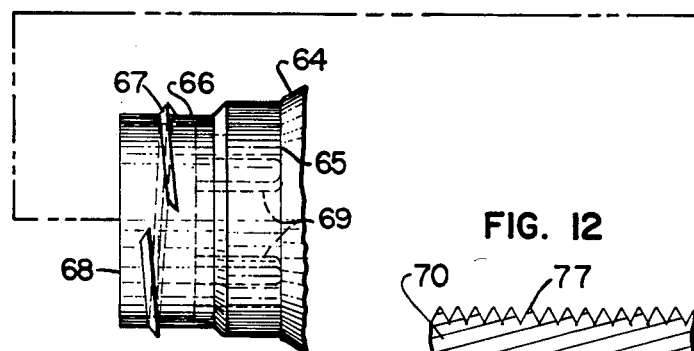
FIG. 12 is an enlarged view of the surface of the adapter element portion of the present invention.
Figure 11:
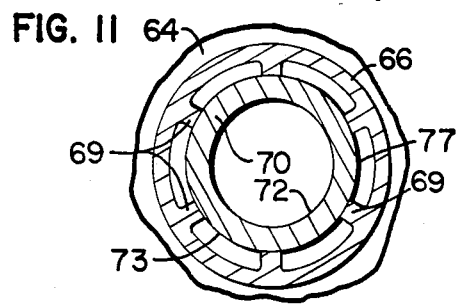
FIG. 11 is an end view of the adapter element portion of the present invention.

As can best be seen in FIGS. 10-12, one novel aspect of the present invention resides in the design and construction of the pail attachment end fitting 59 which is identical to pail attachment end fitting 62. The pail exit spout or dispenser nozzle 64 is an industry standard fitting and is used on many pails and other containers used for transporting and dispensing chemicals and is not limited only to the dispensing of lubricants. The configuration of pail dispenser fitting 64 is a cylinder approximately 1 inch in diameter and it is constructed of a lightweight polyethylene plastic. The dispenser fitting 64 is connected at its base 65 to a suitable collar 66 which is permanently affixed to the parent pail or other container. A single thread 67 almost completely encompasses the circumference of dispenser fitting 64 and is displaced one quarter to one eighth inch from exit end 68 of dispenser 64. Due to the lightweight construction of dispenser fitting 64, reinforcement ribs 69 are molded into dispenser fitting 64 near the base 65.

In practice, the reinforcement ribs 69 are insufficient to give dispenser fitting 64 sufficient radial strength when the liquid being dispensed is withdrawn from the parent container 57 at high flow rates. In practice, the dispenser nozzle 64 tends to collapse radially, thereby causing the thread 67 to withdraw slightly from the hose or other attachment to which it is mated, thereby causing the dispenser nozzle 64 to withdraw completely from the orifice to which it is attached. As can readily be appreciated, the withdrawal of the nozzle during the liquid dispensing operation causes spilling of the liquid being dispensed, creates a safety hazard in the case of toxic chemicals, and at the very least interrupts the fluid dispensing process while the nozzel 64 is reinserted and the flow rate is adjusted so that the fluid is withdrawn more slowly, thereby causing the entire fluid dispensing operation to be more time consuming.

The pail attachment end fitting 59 of the present invention addresses the problem of premature nozzle separation due to pressure induced collapse by reinforcing the pail attachment end fitting 59 with insert 70. The typical pail attachment end fitting 59 is merely a fitting compatibly shaped such that internal thread 71 is configured so as to accept thread 67 from pail dispenser nozzle 64. Since pail nozzle dispenser 64 has but a single thread 67, the threads 71 on pail attachment end fitting 59 extend only a short distance within the body of the end fitting 59 since a greater number of threads would not increase the contact area between thread 71 and thread 67.

Insert 70 comprises a substantially cylindrical passage 72 surrounded by a narrow body 73 and a wide body 74. Pail attachment end fitting 59 contains an inner cylindrical channel 76 defined by walls 75, the channel 76 having a diameter slightly smaller than the diameter of nozzle 64. In practice, the diameter of channel 76 is approximately seven-eighths of an inch, as compared to the diameter of one inch for nozzle 64.

Wide body 74 of insert 70 has a diameter approximately equal to the diameter of channel 76. The surfaces of channel 76 and wide body 74, upon closer inspection, are seen to possess a series of small circumferential grooves 77 as can be seen in FIG. 12. The peaks of groove 77 substantially match the height of grooves 78 within channel 76. Thus, when wide body 74 is inserted within channel 76 the peaks of grooves 77 and 78 forcibly slide past each other while providing a frictional bond. Typically, wide body 74 is inserted fully into pail attachment end fitting 59 until wide body end 74 abuts channel wall 80. PVC cement or other suitable adhesive is used to ensure integrity of the two mated parts 74 & 59.

When wide body 74 is fully inserted within channel 76, narrow body 73 is positioned so as to be aligned with thread 71, thereby providing a gap within which nozzle 64 may be inserted. In practice, nozzle 64 cannot collapse even under great pressure, since the inner surface of nozzle 64 will bear directly against narrow body 73, the reinforcement ring 69 abutting narrow body 73 during a normal operation. The operation of the apparatus and method is as follows. If a funnel 15 is used, the lubricant is poured or delivered into funnel 15 which is firmly seated within mating ring 5. In any event, the lubricant 25 permeates wiper sponge 10 and seeps into channel 17 in conduit 26.

Figure 8:
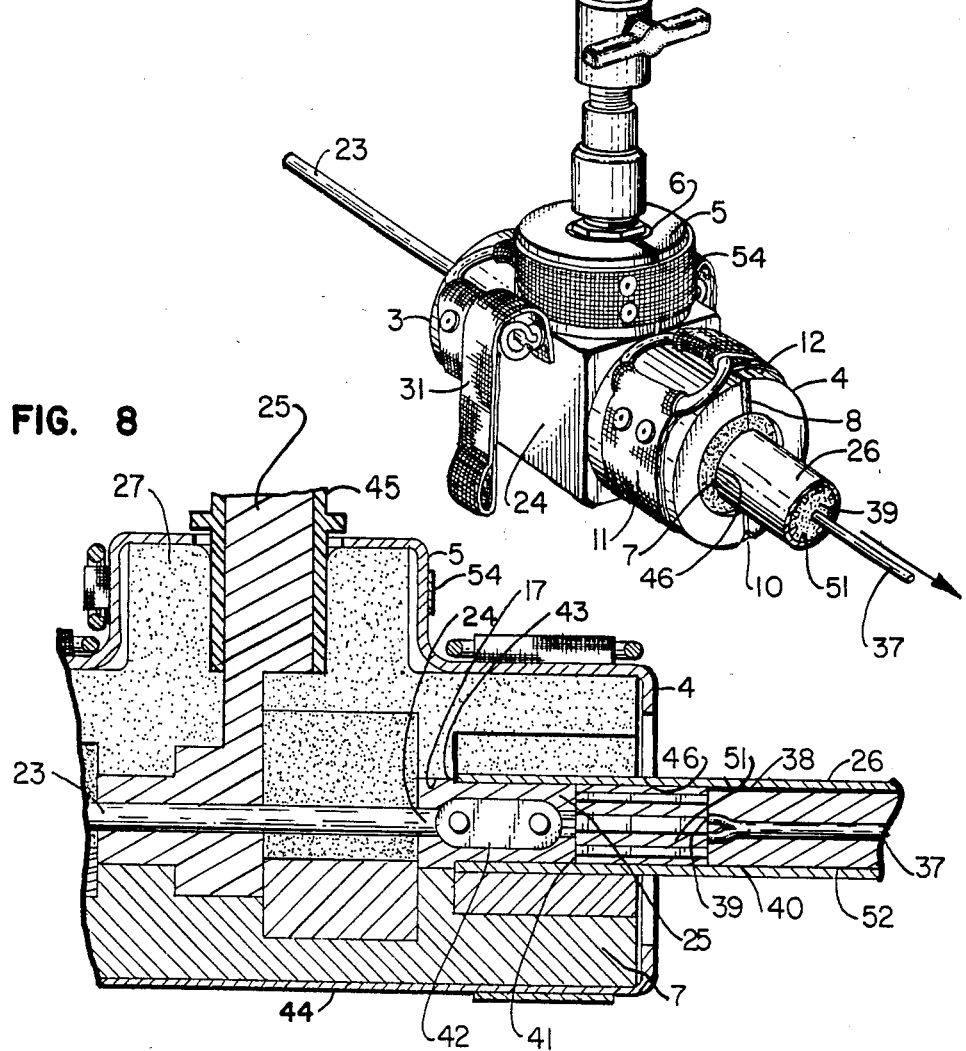
FIG. 8 is a sectional view of the invention as depicted in FIG. 1 showing the initial placement of the spreader sponge element.

As shown in FIG. 8, lubricant 25 fills the channel 17 and flows toward spreader sponge 39.

A combination of the viscosity of lubricant 25 and the depth of grooves 51 causes lubricant to be deposited in a metered quantity within conduit 26. The pressure exerted against inner wall 52 by sponge 39 also forms a seal of lubricant 25 between the surface of sponge 39 and the inner wall 52 of conduit 26.

Figure 9:
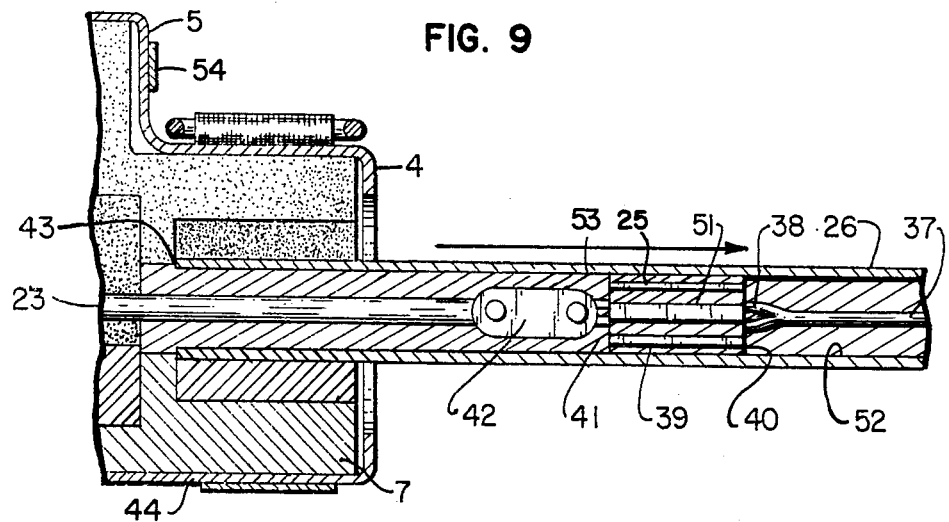
FIG. 9 is a sectional view of the invention as depicted in FIG. 1 showing the effect of forward movement of the spreader sponge element.

As best seen in FIG. 9, the tow line 37 is pulled in the direction of the arrow, thereby advancing the spreader sponge 39 and cable 23 through the conduit 26. Since a seal of lubricant 25 surrounds sponge 39, the air present in the conduit ahead of sponge 39 is unable to transit past the sponge 39 as the sponge 39 is advanced. Therefore, an area of reduced pressure 53 is created directly behind sponge 39, the pressure drop being dependent on the speed at which the tow line 37 is pulled. The effect of the reduced pressure area 53 is to draw lubricant 25 into the conduit at a rate somewhat faster than would be supplied due to the force of gravity alone. The pressure drop is greatest at the beginning of the cable installation since the displacement of air (creating suction behind the spreader) caused by the forward motion of sponge 39 is acting on a small volume of air. As the sponge 39 gets further away from the applicator, the suction effect caused by the air displacement, acts on a much greater volume of air. This causes a lesser pressure drop to be present at the applicator lubricant orifice. Thus, a much greater quantity of lubricant is applied to the front end of the cable than the back end of cable. The decrease in quantity applied is proportional to the distance traveled by the spreader sponge 39. This phenomenon creates superb lubrication since the front end of a cable passes through a greater distance of conduit resulting in a greater amount of lubricant to be rubbed off by contact with the conduit inner surface.

From the foregoing, it may readily be seen that the subject invention comprises a new, unique and exceedingly useful cable lubricator which constitutes a considerable improvement over the known prior art. Obviously, many modifications and variations of the present invention are possible in light of the above teachings. It is, therefore, to be understood that within the scope of the appended claims, the invention may be practiced other than is specifically described.

I claim:

1. A method of lubricating a cable within an air containing conduit, comprising:
    (a) the placement of the cable within a housing, the housing permitting the serial advancement of the cable through the housing and into the conduit;
    (b) the attachment of a spreader sponge to a lead end of the cable, the spreader sponge being substantially cylindrical in shape;
    (c) the placement within the conduit of a quantity of lubricant sufficient to lubricate the conduit independently of the cable lubrication requirements;
    (d) the insertion of the spreader sponge into the conduit by means of a towline, the towline being used to advance the spreader sponge and cable through the conduit, the spreader sponge being diametrically compressed within the conduit;
    (e) the introduction of a lubricant into the housing to coat the cable, the housing becoming relatively airtight when filled with the lubricant; and
    (f) the advancement of the spreader sponge through the conduit, the spreader sponge tending to form a barrier to the passage of air through the conduit, thereby forming a low pressure area within the conduit between the spreader sponge and the housing, the lower pressure area tending to urge relatively large amounts of lubricant onto a length of the cable proximate the lead end, the pressure drop decreasing proportionately to the increased distance traveled by the spreader sponge resulting in a larger quantity of lubricant applied to the front end of the cable.

2. A cable lubricating device, comprising:
    (a) a resilient, elastic, elongated, hollow cylindrical housing, the housing having a longitudinal axis, the housing being split radially along the longitudinal axis to form two mating halves, the hollow housing containing a channel which interconnects an entrance orifice and an exit orifice, the entrance orifice permitting the cable to be introduced into the housing, the cable being slidably advanced through the channel in the housing, the cable leaving the housing through the exit orifice, the cylindrical housing being encased within a molded plastic case, the case being formed as two mating halves secured together by means of a strap, the strap comprising:
        (i) an anchored end, the anchored end being rigidly affixed to one mating half of the case;
        (ii) a free end, the free end being coated with a multitude of flexible hooked fasteners, the strap being wrapped around the lubricating device such that the two mating halves are urged together, the free end securing the mating halves together by gripping the anchored end of the strap;
        (iii) a loop, the loop being rigidly attached to the case proximate the anchored end of the strap, the free end of the strap passing through the loop and gripping the strap so as to secure the two mating halves together;
    (b) a lubricant orifice, the lubricant orifice passing through the housing and entering the channel within the housing between the entrance and exit orifices, such that the cable may be fed serially through the channel as a lubricant is introduced into the channel through the lubricant orifice, thereby lubricating the cable;
    (c) a plurality of substantially cylindrical sponges of absorbent material positioned in the channel, a sponge being located on each side of the lubricant orifice, each sponge having an opening therein through which the cable is serially advanced, wherein an appropriate amount of lubricant is applied to the cable, the plurality of sponges comprising:
        (i) a cleaning sponge, the cleaning sponge residing within the channel within the housing, the cleaning sponge being substantially cylindrical in shape, the cleaning sponge being split radially such that the cable resides within the radial split as the cable is serially advanced through the channel, the cable being cleaned of debris as the cable passes through the cleaning sponge;
        (ii) a wiper sponge, the wiper sponge being substantially identical to the cleaning sponge, the wiper sponge being longitudinally displaced from the cleaning sponge such that the lubricant passing through the lubricant orifice permeates the wiper sponge, the cable being coated with lubricant as the cable passes through the wiper sponge;
        (iii) a spreader sponge, the spreader sponge having a surface, the spreader sponge being substantially cylindrical in shape, the surface of the spreader sponge containing a plurality of longitudinal grooves, the spreader sponge being affixed to the leading end of the cable, the spreader sponge being diametrically compressed within the conduit such that an appropriate quantity of lubricant may pass by the compressed spreader sponge, the lubricant coating the surface of the spreader sponge thereby forming a seal preventing the passage of air past the spreader sponge as the spreader sponge advances through the conduit;

(d) a cavity, the cavity being in the channel within the housing, the wiper sponge residing within the cavity such that the wiper sponge is compressed as necessary to apply an optimum amount of lubricant to the cable, the cable having a leading end, the leading end being placed within a conduit having an outside diameter, the conduit containing air, the lubrication of the cable within the housing permitting the leading end of the cable to advance through the conduit, the channel within the housing having an inside diameter, the inner diameter being somewhat smaller than the outside diameter of the conduit, the resilient material permitting the conduit to be forcibly inserted into the channel and frictionally secured thereto;

(e) an adapter assembly, the adapter assembly comprising:
 (i) a sealed container, the sealed container containing lubricant;
 (ii) a sealed container attachment dispenser nozzle, the dispenser nozzle permitting lubricant to flow from the sealed container through the dispenser nozzle;
 (iii) a pail attachment end fitting operatively interconnected to the dispenser nozzle;
 (iv) a first control valve, the control valve metering the amount of lubricant flowing through the end fitting;
 (v) a hose, the hose being attached to the first control valve;
 (vi) a second control valve, the second control valve being attached to the hose at an end opposite from the first control valve, the second control valve being an on/off valve; and
 (vii) an attachment assembly, the attachment assembly being compatibly formed so as to mate with the housing, thereby permitting lubricant to flow from the sealed container through the house and through the lubricant orifice and onto the cable to be lubricated;

(f) an insertable body placed between the end fitting and the dispenser nozzle, the insertable body comprising:
 (i) a wide body, the wide body being substantially cylindrical and having a diameter slightly greater than the inner diameter of the end fitting;
 (ii) a narrow body, the narrow body being integrally formed and coaxially aligned with the wide body, the wide body having a diameter slightly smaller than an inner diameter of the dispenser nozzle; and
 (iii) a circumferentially grooved surface, the surface being integrally formed as part of both the wide body and the narrow body, the entire insertable body being formed such that the wide body may be frictionally inserted into the end fitting and connected therewith, and the narrow body may be inserted within the dispenser nozzle, such that the dispenser nozzle may be threaded into the end fitting, the narrow body tending to support the dispenser nozzle such that the dispenser nozzle will not collapse when subjected to radially inward pressures.

3. The lubricating device of claim 2, wherein an area of low pressure is formed within the conduit between between the spreader sponge and the housing as the spreader sponge is advanced through the conduit, the low pressure area tending to attract relatively large quantities of lubricant from within the housing into the conduit, thereby further lubricating the cable within the conduit, The extra quantity applied decreases proportionally to distance travelled by spreader sponge.

* * * * *